US007260573B1

(12) United States Patent
Jeh et al.

(10) Patent No.: US 7,260,573 B1
(45) Date of Patent: Aug. 21, 2007

(54) PERSONALIZING ANCHOR TEXT SCORES IN A SEARCH ENGINE

(75) Inventors: Glen Jeh, San Francisco, CA (US); Taher H. Haveliwala, Mountain View, CA (US); Sepandar D. Kamvar, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 543 days.

(21) Appl. No.: 10/848,599

(22) Filed: May 17, 2004

(51) Int. Cl.
*G06F 17/30* (2006.01)
(52) U.S. Cl. ............... 707/7; 707/3; 707/10; 715/501.1
(58) Field of Classification Search .................... 707/7, 707/3, 10; 715/501.1
See application file for complete search history.

(56) References Cited

U.S. PATENT DOCUMENTS

| | | | | |
|---|---|---|---|---|
| 5,920,859 | A * | 7/1999 | Li ................................. | 707/5 |
| 6,285,999 | B1 | 9/2001 | Page ............................. | 707/5 |
| 6,636,848 | B1 * | 10/2003 | Aridor et al. .................. | 707/3 |
| 2002/0169770 | A1 * | 11/2002 | Kim et al. ...................... | 707/5 |
| 2003/0208482 | A1 * | 11/2003 | Kim et al. ...................... | 707/3 |
| 2004/0215606 | A1 * | 10/2004 | Cossock ........................ | 707/3 |
| 2005/0071741 | A1 * | 3/2005 | Acharya et al. ............ | 715/500 |
| 2005/0114324 | A1 * | 5/2005 | Mayer ........................... | 707/3 |
| 2005/0165781 | A1 * | 7/2005 | Kraft et al. .................... | 707/7 |
| 2005/0240580 | A1 * | 10/2005 | Zamir et al. ................... | 707/4 |

OTHER PUBLICATIONS

Tsukasa Hirashima et al, "Context-Sensitive Filtering for Browsing in Hypertext", ACM 1998, pp. 119-126.*

Brin, S., et al., "The Anatomy of a Large-Scale Hypertextual Web Search Engine," In Proc. of the 7th Int'l World Wide Web Conf., 1998, 26 pages.

Haveliwala, T.H., "Topic-Sensitive PageRank," In Proc. of the 11th Int'l World Wide Web Conf., May 2002, 10 pages.

Jeh, G., et al., "Scaling Personalized Web Search," In Proc. of the 12th Int'l World Wide Web Conf., 2003, 9 pages.

Kamvar, S.D., et al., "Exploiting the Block Structure of the Web for Computing PageRank," Stanford Univ. Technical Report, 2003, 13 pages.

* cited by examiner

*Primary Examiner*—Uyen Le
(74) *Attorney, Agent, or Firm*—Morgan, Lewis & Bockius LLP

(57) ABSTRACT

A search engine identifies a list of documents from a set of documents in a database in response to a set of query terms. For each document in the list, the search engine determines an information retrieval score based on its content and the query terms, and also identifies a set of source documents that have links to the document and that also have anchor text satisfying a predefined requirement with respect to the query terms. The search engine calculates a personalized page importance score for each of the identified source documents according to a set of user-specific parameters and accumulates the personalized page importance scores to produce a personalized anchor text score for the document. The personalized anchor text score is then combined with the document's information retrieval score to generate a personalized ranking for the document. The documents are ordered according to their respective personalized rankings.

51 Claims, 6 Drawing Sheets

PERSONALIZING ANCHOR TEXT SCORES IN A SEARCH ENGINE

CROSS-REFERENCE TO RELATED APPLICATIONS

This application is related to patent application Ser. No. 10/646,331, filed Aug. 22, 2003, "Improved Methods For Ranking Nodes In Large Directed Graphs," which is hereby incorporated by reference.

FIELD OF THE INVENTION

The present invention relates generally to the field of search engines for locating documents in a computer network system, and in particular, to a system and method of personalizing search results produced by a search engine in accordance with user-specific parameters.

BACKGROUND OF THE INVENTION

Search engines provide a powerful tool for locating documents in a large database of documents, such as the documents on the World Wide Web (WWW) or the documents stored on the computers of an Intranet. The documents are located in response to a search query submitted by a user. A typical search query includes only two to three terms. As the number of documents accessible via the Internet grows, the number of documents that match the search query may also increase. However, not every document matching the search query is equally important from the user's perspective. As a result, a user might be overwhelmed by the enormous number of documents retrieved by a search engine, if the search engine did not order the search results based on their relevance to the user's query.

One approach to improving the relevance of search results to a search query is to use the link structure of the documents in the database, such as the links between documents on the WWW, to compute global "importance" scores for the documents in the database. These scores are used to affect the order of search results when they are presented to the user. This approach is sometimes referred to as the PageRank algorithm. A more detailed description of the PageRank algorithm can be found in the article "The Anatomy of a Large-Scale Hypertextual Search Engine" by S. Brin and L. Page, 7$^{th}$ International World Wide Web Conference, Brisbane, Australia and U.S. Pat. No. 6,285,999, both of which are hereby incorporated by reference as background information.

An important assumption of the PageRank algorithm is that there is a "random surfer" who starts his web surfing at a randomly selected web page and keeps clicking on the links embedded in the web pages, never clicking on the "back" button. Occasionally, the random surfer re-starts his surfing by randomly picking another web page. The probability that the random surfer visits (i.e., views or downloads) a web page is a function of its PageRank. A web page may have a high PageRank if there are many other web pages pointing to it, or if some of the web pages pointing to it have a high PageRank. For example, www.espn.com is a famous website reporting sports-related news. It is conceivable that there are many web pages over the Internet having links to www.espn.com. In contrast, www.gostanford.com is a website that only reports news about the sports teams of Stanford University. For the purposes of this explanation, we will assume that www.espn.com is more frequently visited by WWW users than www.gostanford.com, and we will further assume that www.espn.com has a higher PageRank than www.gostanford.com.

For each link in the link structure (representing links between the documents in the database), there is a pair of source and destination web pages. Source pages are also sometimes called "referring" pages. Further, many links in source web pages are associated with text that describes the destination web page of the link. Such text, commonly referred to as anchor text, often provides a more concise and accurate description than the destination web page itself and therefore can be used in determining the relevance of the destination web page to a particular query. FIG. 1 provides two examples of the link structure between different web pages. Each of the source web pages 110-1 and 120-1 has an embedded link pointing to one of the two destination web pages 110-2 and 120-2, respectively. An anchor text "Sports News" is associated with each link, characterizing the key feature of the corresponding destination page. When a user submits a query for "sports news" to a search engine (such as the Google search engine) that considers a web page's PageRank and anchor text, the engine may return both web pages 110-2 and 120-2. If so, the www.espn.com web page 120-2 would likely be displayed higher in the search results than the www.gostanford.com web page 110-2 because page 120-2 has a higher PageRank than page 110-2. It is noted that the Google search engine, as of late 2003, determines the position of a document in a set of search results as a function of the PageRanks of the documents in the search results, the query terms, the documents in the search results, and the anchor text of links to those documents. For purposes of this discussion, we have assumed that large differences in the PageRanks of two documents often determine their relative position in a set of search results.

When using a conventional search engine, the ordering of documents in a set of search results may be less than optimal for a user with specific personal preferences. In particular, documents of highest interest to the user may be positioned lower in the search results than one or more other documents. It would be desirable to have a system and method of making the order of documents in a set of search results more attuned to a user's personal preferences, and it would be desirable for such a system to be computationally feasible.

SUMMARY

In a method of personalizing the search results produced by a search engine, in accordance with a set of user-specific parameters, a search engine produces a set of search results in response to a query. The search results identify a set of documents, each of which is assigned an information retrieval score based on its content and the query terms. In some embodiments, the information retrieval score is a query dependent score that does not take into account the user-specific parameters. For a document in the identified set of documents, the method identifies a set of source documents having links to the document. The anchor text of each of the identified source documents is examined to determine if the anchor text satisfies a predefined requirement with respect to the query terms. After identifying the source documents whose anchor text satisfies the predefined requirement, a personalized page importance score is computed for each of the identified source documents according to the set of user-specific parameters.

A personalized anchor text score is generated for the document by accumulating the personalized page importance scores of the identified source documents. The personalized anchor text score of a document is combined with the document's information retrieval score to produce a personalized ranking for the document. The personalized ranking can be used in ordering the document in the search results.

In one embodiment, the personalized page importance score of a document is a personalized link analysis score (a personalized PageRank is sometimes used for this score), which is based on an analysis of the linkages between documents that are directly or indirectly linked to this document. In some embodiments, the user-specific parameters includes a list of use favored websites, or includes URL keywords suitable for identifying user favored websites. The user-specific parameters may be provided by the user, collected from a third-party having such information, or derived by analysis of the user's previous search queries and the documents selected by the user from the search results of the user's previous search queries.

In another aspect, a search engine system is configured to personalize the search results produced by a search engine, in accordance with a set of user-specific parameters, using the methodologies summarized above.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF EMBODIMENTS

Figure 1:
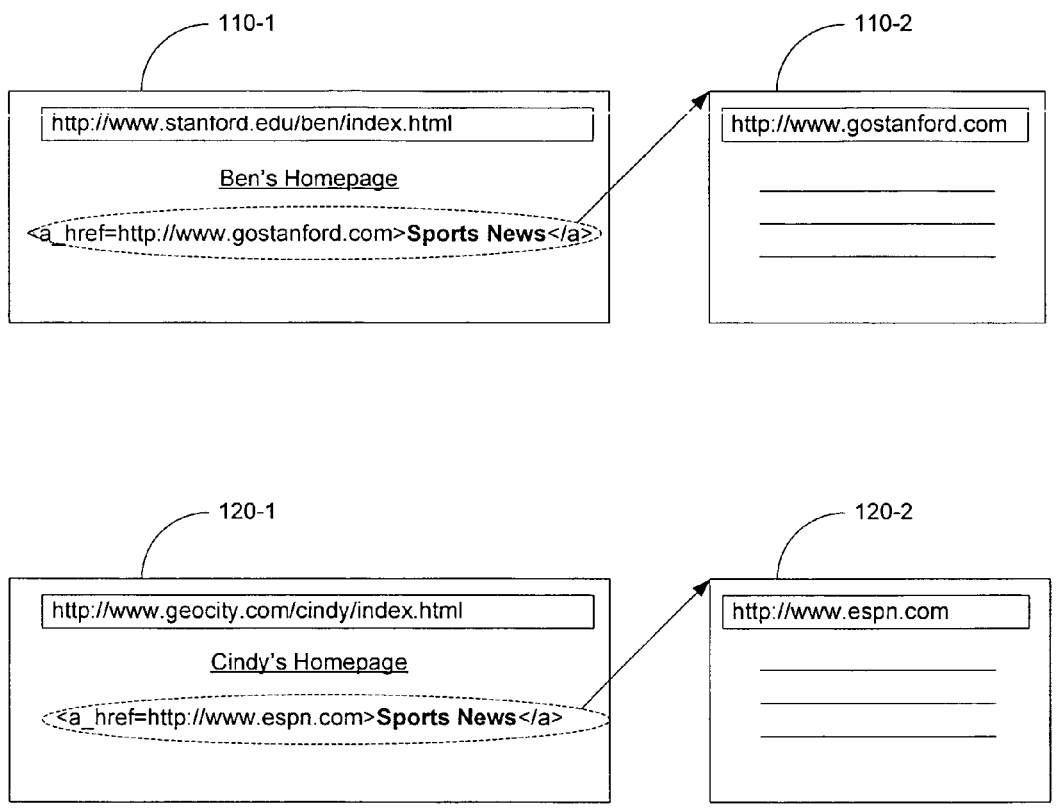
FIG. 1 provides two examples of the link structure between different web pages, the two source web pages of the two examples having the same anchor text.

Referring to FIG. 1, assume that a user named Adam is looking for a website covering Stanford's sports teams. For the purposes of this explanation, we will assume that Adam would prefer that the search engine return www.gostanford.com 110-2 ahead of www.espn.com 120-2. To achieve this goal, one approach would be to allow a user like Adam to instruct the search engine to personalize the rankings of search results by providing appropriate user information such as the user's background information or a plurality of favorite websites. For example, Adam may register with the search engine that he prefers web pages whose URL includes the term "Stanford" over other web pages.

In FIG. 1, source page 110-1 (www.stanford.edu/ben/index.html) has a URL that includes "stanford", while source page 120-1 (www.geocity.com/cindy/index.html) does not. If Adam enters a search query of "sports news", the query terms will be found in the anchor text of both of these source pages 110-1, 120-1. Furthermore, based on Adam's registered search preferences, source page 110-1 should receive a higher score than source page 120-1. Described below are embodiments of search engine systems and methods for ranking and ordering search results in accordance with a user's preferences. Using these systems and methods, the web page www.gostandford.com 110-2 may be ranked higher and ordered before web age www.espn.com 120-2, depending on a variety of factors that are taken into account by the search result ranking function of the search engine.

Figure 2:
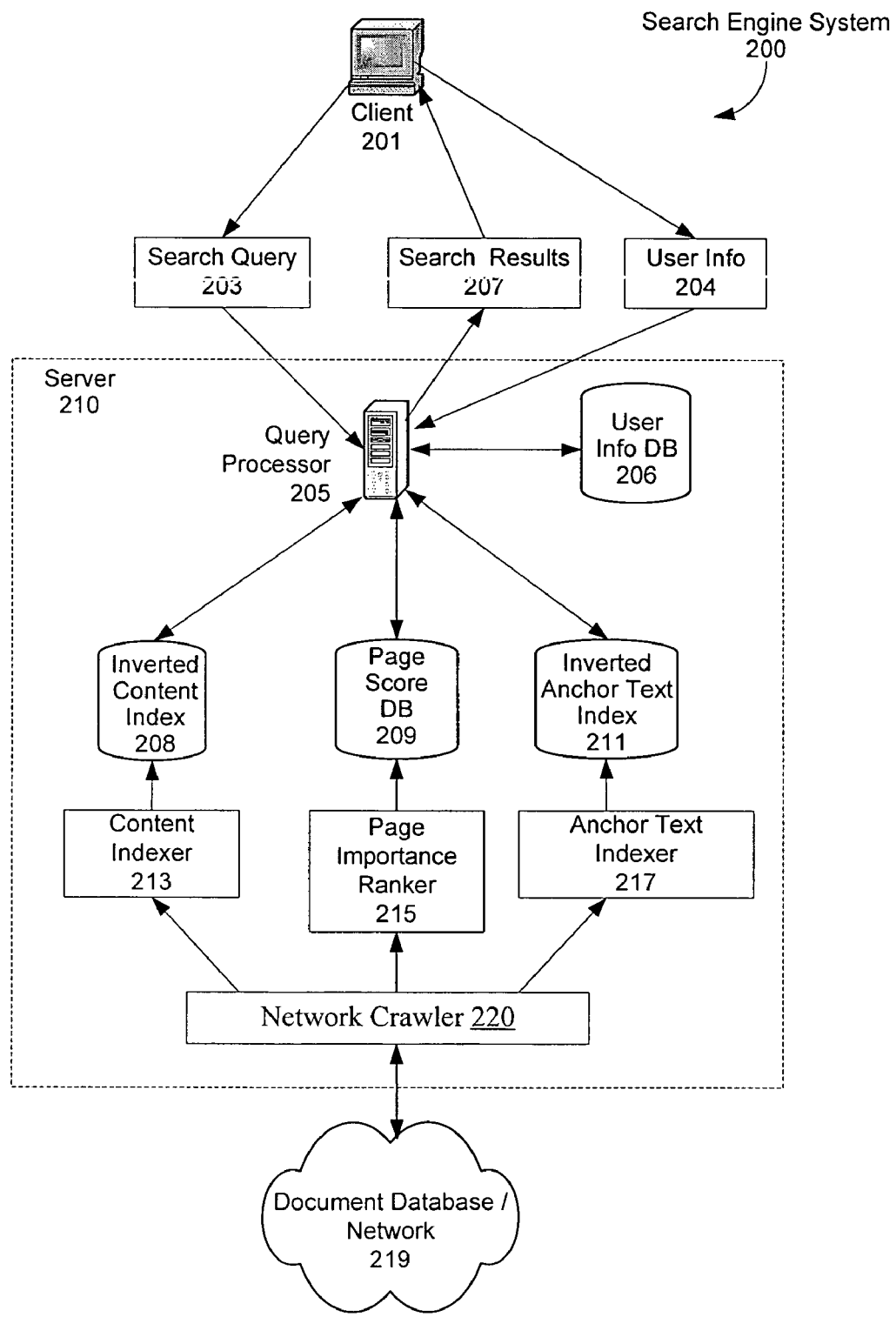
FIG. 2 is a simplified diagram illustrating a search engine system that utilizes user specific information to produce personalized search results.

FIG. 2 is a simplified diagram illustrating a search engine system 200. The search engine system 200 is implemented in a client-server network environment, which comprises one or more client computers 201 and one or more server computers 210. Prior to any searches being performed on behalf of users, a network crawler 220 (sometimes called a web crawler) locates and downloads documents from a document database or network 219 (e.g., the Internet or an Intranet). In some embodiments, these documents are processed by a content indexer to produce a set of indexes and databases are generated The documents downloaded by the network crawler 220 are stored in the server and analyzed by different components of the server 210. For instance, when a document arrives at the server 210, a content indexer 213 generates inverted content index entries for the document, which are stored in or added to the inverted content index 208. A page importance ranker 215 computes the document's page importance score. In some embodiments, the page importance score is the document's PageRank, which is a score generated using a specific link analysis methodology that propagates rank through links. A document's PageRank is based on the PageRanks of the documents that have links to the document. The resulting page importance scores are stored in a database 209. In other embodiments, the page importance scores could be replaced by another set of scores, such as scores produced using another link analysis methodology or scores produced using yet another page importance determination methodology.

An anchor text indexer 217 is responsible for generating an inverted anchor text index 211 from the links in each document received by the server 210, including the text surrounding the links. The links and corresponding text are extracted from each document and stored in records identifying the source document, the target document associated with a link, and the anchor text associated with the link. When a sufficient number of such records have been accumulated, an inverted anchor text index 211 is generated, mapping anchor text terms to the documents that are the target of the corresponding links. In some embodiments, the inverted anchor text index 211 is merged with or incorporated in the inverted content index 208. More information about anchor text indexing is provided in U.S. patent application Ser. No. 10/614,113, filed Jul. 3, 2003, "Anchor Text Indexing in a Web Crawler System", which is hereby incorporated by reference.

A user of the system 200 first submits a search query 203 through a client 201. A search query typically includes a set of query terms, which identify terms to be included in documents that satisfy the search query. The search query is processed by a query processor 205 on the server side. Based on the search query, the query processor 205 generates search results 207, typically a list of documents that satisfy the search query 203, and returns the search results to client 201.

Within server 201, the query processor 205 communicates with various databases to identify documents that satisfy the search query and to determine how to order the search results. In some embodiments these includes the inverted content index 208, the page importance scores database 209 and the inverted anchor text index 211. For example, the database that stores the inverted content index 208 first returns a set of documents identifiers, which identify documents that contain the query terms of the search query. Optionally, the query processor 205 may submit the same query to the database storing the inverted anchor text index 211 to find another set of documents that satisfy the search query. It is possible that a document may appear in both sets of documents. Finally, the two sets of documents are submitted to the page importance scores database 209 and ordered in accordance with their respective page importance scores. In some systems, the ordering of documents is query dependent, taking into account the documents' query independent page importance scores (one example of which is PageRank) as well as the position(s) in which the query terms are found in the documents within the search result.

The search engine system 200 further includes a user information database 206, with personalization information for its users. The personalization information for each respective user is herein called a user profile. The term user profile is used here without limitation on the particular data structures and methodology used to store the personalization information.

In some embodiments, in addition to submitting a search query 203 to the server 210, a user can also submit user information 204 to the server 210. The user information 204 may be in the form of a user profile or a set of user-specific parameters characterizing a user's background and preferences. In one embodiment, user information 204 is submitted to the server together with the search query 302. In another embodiment, user information is submitted to the server separately. In yet another embodiment, the user information 204, is derived by the server 210 at least in part from search queries previously submitted by the user and by the documents in the search results that the user chooses to view or use. In some embodiments, when the server 210 receives (or derives) user information 204, it stores such information in a user information database 206 and associates the user information with a unique user ID. In other embodiments, the server 210 receives the user information 204 with each search query and does not retain such user information for use when processing subsequent search queries.

In some embodiments, the user information is used to compute personalized page importance scores for at least a subset of the documents retrieved by the network crawler 220. The Page Importance Ranker 215 generates a system page importance score for each document, as well as a set of user-specific (personalized) page importance scores for at least a subset of the retrieved documents. The Page Importance Ranker 215 utilizes the user-specific parameters to compute a personalized page importance score for at least a subset of the documents retrieved by the server 210 from the network or document database 219. In one embodiment, the Page Importance Ranker 215 accomplishes this task using an efficient link analysis calculation method taught in greater detail in the co-pending application Ser. No. 10/646,331, filed Aug. 22, 2003, which is hereby incorporated by reference. Conceptually, when computing personalized page importance scores, the Page Importance Ranker 215 boosts the page importance scores of documents that are deemed to match the user-specific parameters, which in turn boosts the downstream documents linked to those documents. From another viewpoint, the Page Importance Ranker 215 boosts the page importance scores of documents of each host whose URL matches one or more of the user-specific parameters.

In some embodiments, a document is be deemed to match (or not match) user-specific parameters solely based on the URL of the document. In other embodiments, a document is deemed to match the user-specified parameters based not only on the URL of the document, but also based on the content of the document, and/or based on the anchor text content of links to the document. When a document is deemed to match the user-specific parameters in a user profile (e.g., if the URL of the document includes any of URL keywords in the user profile), the document is assigned a personalized page importance score specified by a parameter in the user profile. For example, the user profile may specify for each URL keyword a particular page importance score adjustment that is to be applied to matching documents. When a document matches more than one URL keyword, the largest such page importance score adjustment is applied to the document. In other embodiments, the user profile may specify the adjustment or assignment of personalized page importance scores in other ways.

Note that the personalized page importance score of a document is only a function of the document, the user-specific parameters, and the link structure through which the document is related to other documents. In other words, the personalized page importance score of a document is a ranking factor that is independent of any individual search query submitted by the user to the search engine. However, it should be noted that in some embodiments the server 210 is configured to generate at least some of the user-specific parameters based on previous search queries submitted by the user, and thus a user's search queries may indirectly affect a document's personalized page importance score. For example, if a user has submitted many queries related to the standard aptitude test (SAT), the server 210 may update his user information and incorporate this information into the set of user-specific parameters.

In some embodiments, due to storage and computational limitations, the number of documents for which personalized page importance scores are stored by the server 210 is limited. For instance, the server 210 may store up to N personalized page importance scores for each user, and furthermore will store personalized page importance scores only for those documents where the personalized page importance scores differs form the system (non-personalized) page importance scores. In another example, the server 210 may store up to N personalized page importance score adjustment values, each for documents whose address or URL has a prefix indicating a respective web host. When the server 210 is processing a search query from a user for which it has a user profile that includes a stored set personalized page importance scores, it retrieves page importance scores from both the page importance scores database 209 and the user information database 206. Where a page importance score for a particular document is found in both databases 215, 206, the page importance score from the user information database 206 is used (or, in some embodiments, the adjustment value from the user information database is applied to the system page importance score). Alternately, the server 210 first retrieves page importance scores from the user information database 206, and then retrieves page importance scores from the page importance scores database 209 only for those documents for which a personalized page importance score (for the user who submitted the search query being processed) is not found in the user information database 206.

In some embodiments, a personalized page importance score is determined for a respective document at runtime, while the server 210 is processing a search query. In particular, the personalized page importance score is generated by determining the set of documents that have links referring to the respective document, determining personalized page importance scores for the referring documents based on the user profile of the user, and then computing a personalized page importance score for the respective document as a function of the personalized page importance scores of the referring documents. This methodology may be extended to the "grandparent" documents that refer to the referring documents. While the personalized page importance scores produced by this runtime methodology may differ from those produced by a Page Importance Ranker using a full network link analysis, it avoids or largely reduces the persistent storage of personalized page importance scores.

In the remainder of this document, when a document's page importance score is retrieved or otherwise determined, the source of the page importance score will be understood to be either a page importance scores database 209, or a personalized page importance score associated with the user whose search query is being processed.

The personalized page importance scores of source documents having links to a destination document can be used in many different ways. For example, the personalized page importance scores can be used in a method for generating a personalized and query-dependent ranking for the destination document. Such ranking can be used for ordering the destination document in the search results or for other further analysis.

Figure 3:
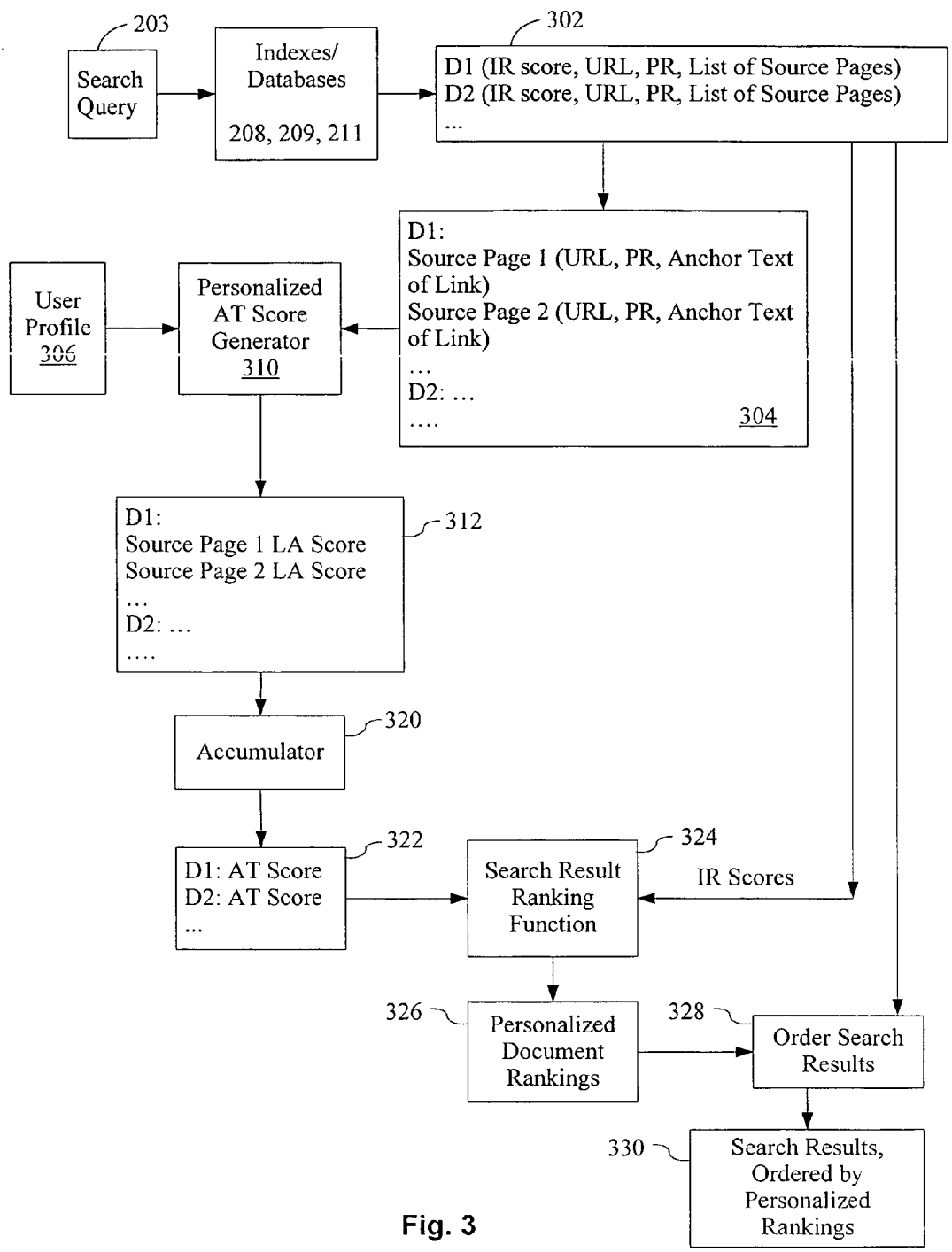
FIG. 3 is a conceptual diagram of a method for ordering search results in accordance with a user profile.

FIG. 3 is a conceptual representation of one embodiment of a method for personalizing the ordering of documents in a set of search results. In this embodiment, the system page importance score for each document is the document's PageRank, and each document's personalized page importance score is a personalized link analysis score. A search query 203 is processed using a set of indexes and databases 208, 209, 211 (FIG. 2) to produce an initial set of search results 302. These search results include a list of documents D1, D2, etc., and a set of parameters for each respective document, including an Information Retrieval (IR) score, the address or URL of the respective document, the respective document's PageRank (PR), and a list of source pages that refer to the respective document. The Information Retrieval score of a document is a query dependent score assigned to the document based on the prominence of the query terms in the document or in the anchor text of links to the document.

In some embodiments, the source pages listed for a respective document are limited to those that satisfy a predefined requirement with respect to the search query. For instance, in one embodiment the predefined requirement is that the anchor text of the link to the respective document contain at least one query term of the search query. In another embodiment, the predefined requirement is that the anchor text of the link to the respective document satisfy the entire search query, which may be a Boolean expression containing multiple query terms. In yet other embodiments, all source documents are included, without respect to whether the anchor text of the links to the respective document contain any of the query terms. However, limiting the source documents to those whose links have anchor text that includes at least one query term is preferred because this ensures that only source documents with anchor text relevant to the search query are used to personalize the ordering of the documents within the search results.

Next, source document information 304 is extracted from the initial search results. The source document information 304 and the user profile 306 of the user who submitted the search query are used by a Personalized Anchor Text (AT) Score Generator 310 to generate personalized link analysis (LA) scores 312 for the source pages that correspond to each respective document (D1, D2, etc.) in the initial search results. In some embodiments, the personalized LA score for a source document is its personalized page importance score (e.g., personalized PageRank), while in other embodiments, the personalized LA score for a source document is a function of its personalized page importance score. The computation of personalized page importance scores is discussed above.

An accumulator 320 sums or otherwise combines the personalized LA scores for the source documents that link to each respective, thereby producing an anchor text (AT) score for each respective document in the initial search results. A search result ranking function 324 is then used to combine, for each respective document, the AT score and the IR score of the document to produce a set of final personalized ranking scores or values 326. The documents are then ordered (326) in accordance with the personalized document rankings to produce a final, ordered set of search results 330.

Figure 4:
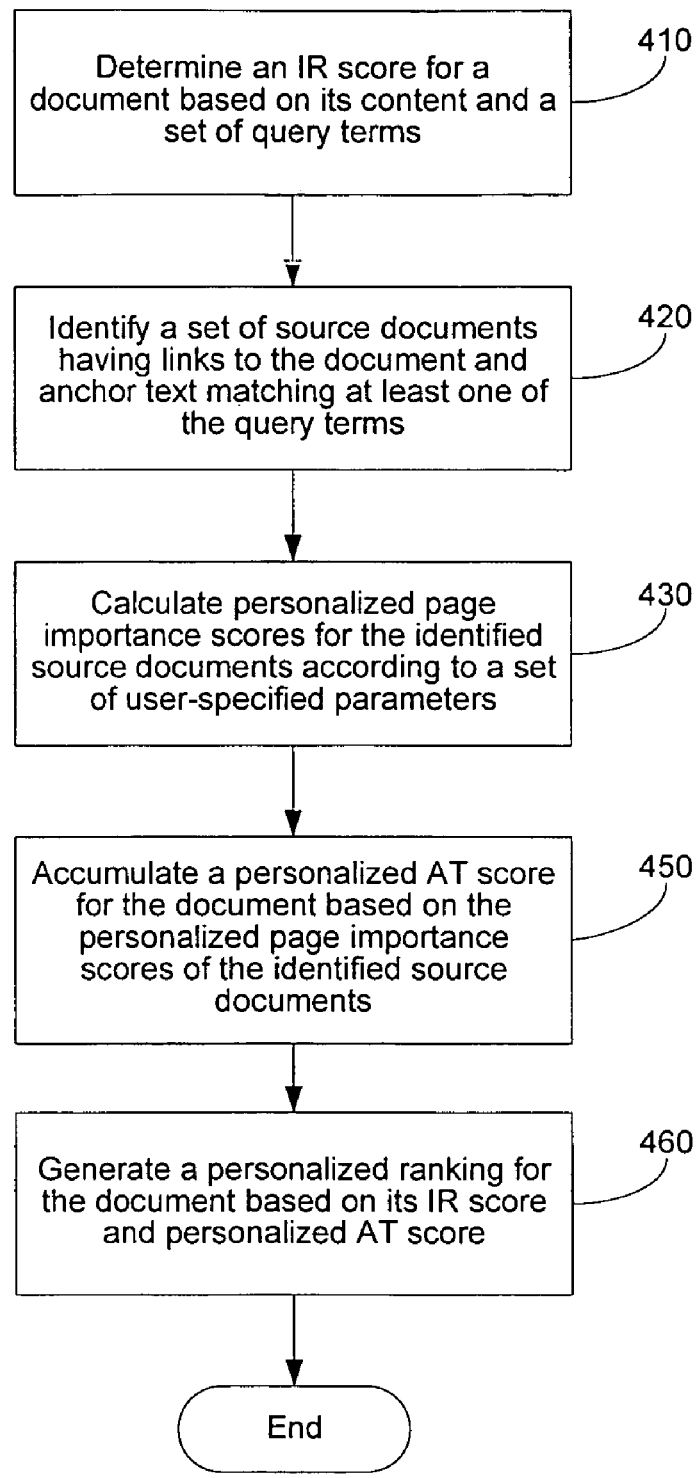
FIG. 4 is a flowchart of a method of determining a personalized ranking for a document in a set of search results.

FIG. 4 is a flowchart illustrating the major steps of such a method according to one embodiment of the present invention. Given a candidate document with its content known, the first step 410 of the method is to determine an information retrieval (IR) score based on the document's content and the query terms in the search query. If the user information is also employed in determining the IR score of the document, the IR score will be user-dependent or personalized on the user. Otherwise, the IR score is usually user-independent.

At step 420, based on the link structure associating various documents, the computer program identifies a set of source documents, each of which having a link to the candidate document and certain anchor text associated with its link. In one embodiment, the anchor text in a source document needs to match at least one query term in order for the source document to contribute to determining the candidate document's personalized ranking. For example, assuming that there are three source documents $D_1$, $D_2$, and $D_3$ having links to a candidate document $D_0$, if $D_1$'s anchor text matches one query term $T_1$, $D_2$'s anchor text matches another query term $T_2$, but $D_3$'s anchor text does not match any query term, then only $D_1$ and $D_2$'s personalized page importance scores are considered when determining $D_0$'s personalized ranking. In another embodiment, the requirement that anchor text contain at least one query term is dropped and therefore any source document having a link to $D_0$, including $D_3$, can make a contribution to $D_0$'s personalized ranking based on its personalized page importance score.

At step 430, the computer program calculates a personalized link analysis (LA) score for each of the source documents identified at step 420. In one embodiment, this LA score is the same as the personalized page importance score of the document that is determined by the Page Importance Ranker 215 (FIG. 2) on the basis of a set of user-specific parameters. Therefore, in the example shown in FIG. 1, web page 110-1 should have a higher personalized page importance score or LA score than web page 120-1 based on a set of user-specific parameters provided by the user.

Once all the source documents' LA scores are known, the computer program accumulates them together to produce a personalized anchor text (AT) score for the candidate document (step 450). As discussed above, this personalized AT score is different from the conventional usage of anchor text, which is based solely on the textual content of the anchor text associated with a link to a candidate document. Besides the textual content of each anchor text, the personalized AT score is also a function of the personalized page importance score of a source document that includes the anchor text. In one embodiment, assuming that there is a set of N source documents having links to a candidate document and the ith source document's personalized page importance score is $ps_i$, then the candidate document's personalized AT score can be defined as $$AT = \sum_{i \in N} ps_i \cdot at_i$$

where $at_i$ is the ith source document's anchor text weight. In some embodiments, a source document's anchor text weight $at_i$ has two possible values, 1 if the anchor text contains at least one query term or 0 if the anchor text contains no query term. In this case, the candidate document's personalized AT score can be computed as $$AT = \sum_{i \in N} ps_i.$$

More generally, the anchor text weight of $at_i$ an identified source document i is equal to a first value when its anchor text satisfies a predefined requirement with respect to the set of query terms, and is equal to a second value when the anchor text does not satisfy the predefined requirement with respect to the set of query terms.

At step 460, the method combines the IR score and personalized AT score together to generate a personalized ranking for the candidate document. In some embodiments, the method computes a predefined function of the IR score, the page importance score (PS) and the personalized AT score of the candidate document to generate the personalized ranking:

Personalized Ranking=$F1$(IR score,PS,AT score)

where F1 is the predefined function. As noted above, the page importance score for the candidate document may be either a system (not personalized) page importance score (e.g., the PageRank), or it may be a personalized page importance score. The personalized rankings for a set of candidate documents can be used by a search engine to order search results or for other further analysis.

Figure 6:
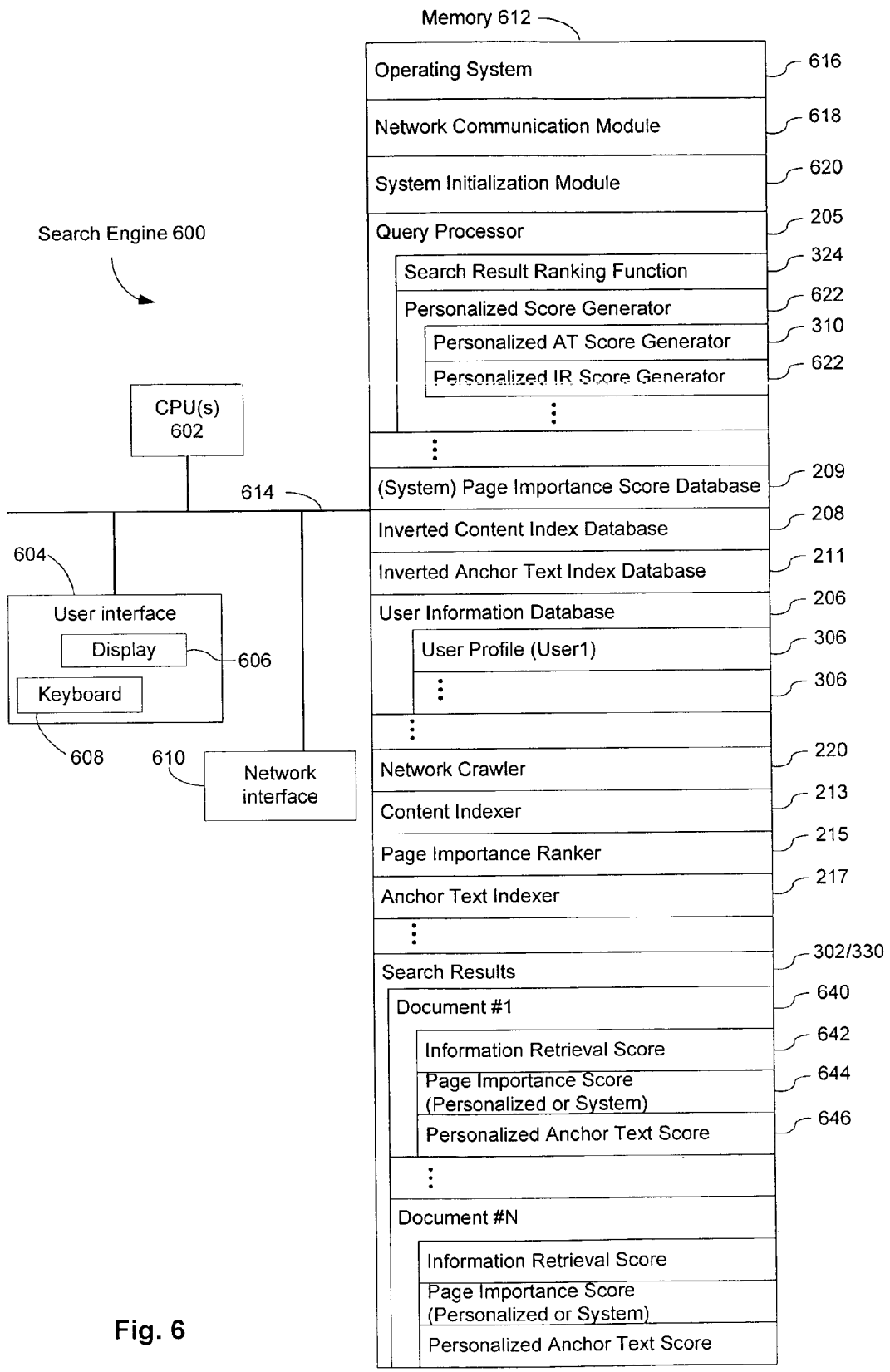
FIG. 6 is a block diagram of a search engine configured to generate personalized search results.

In some embodiments, the IR score for a candidate document is also personalized using a personalized IR score generator 622 (FIG. 6). In particular, the IR score is personalized by adding to each search query a set of terms obtained from the user profile. The added terms (herein called the user profile terms) are treated as optional terms, not required for satisfying the query, but which contribute to the IR score of the document if the terms are found within the content of a document that satisfies the search query. For instance, the IR score of a document will be increased if any of the user profile terms are located in the title of the document, in the URL of the document, or in the first K words of the document, where K is a predefined value. The resulting IR value is herein called a personalized IR value, and in such embodiments the personalized ranking function is applied to personalized IR value, along with the page importance score and AT score of the document to produce a personalized ranking value.

Figure 5:
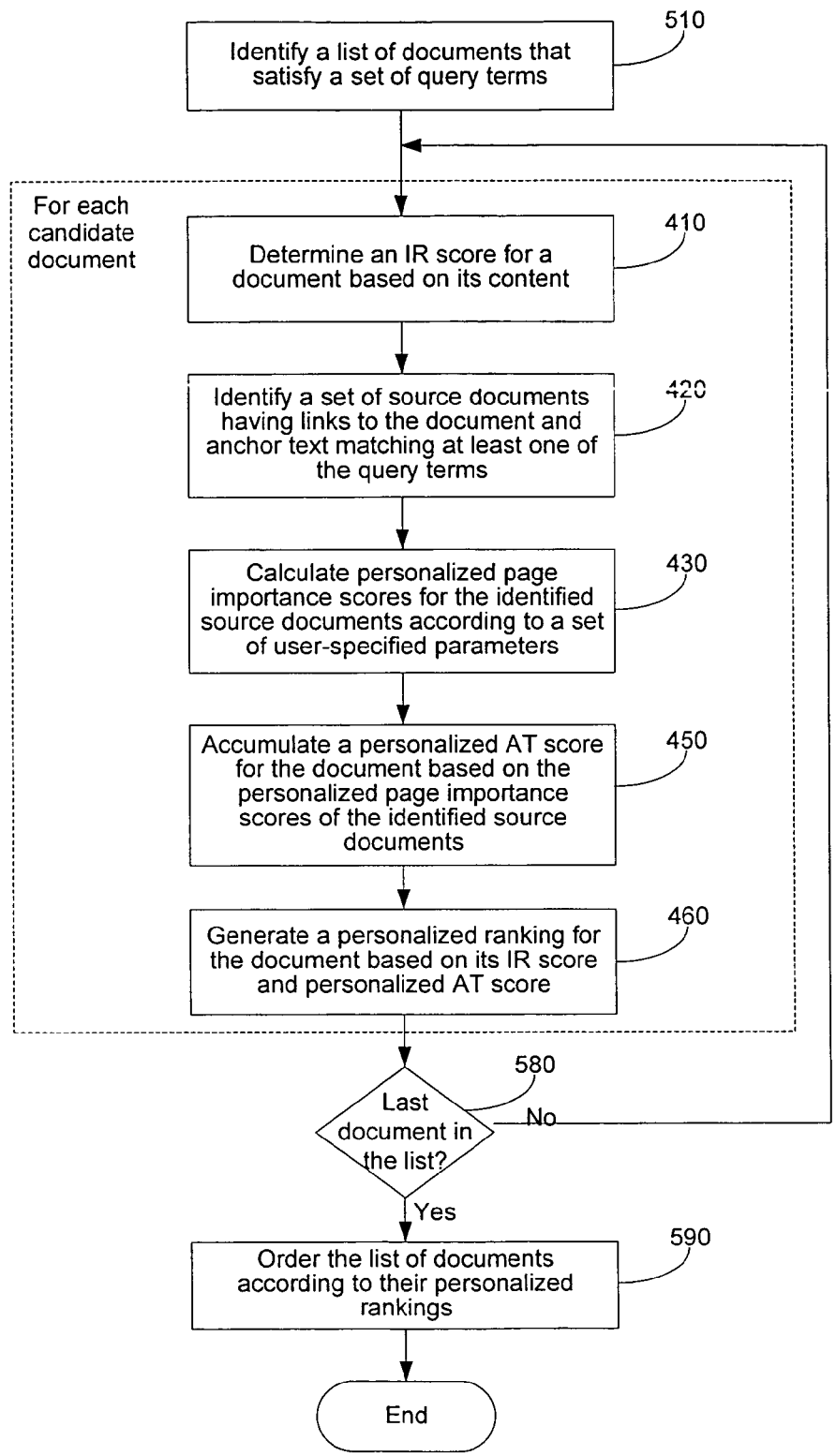
FIG. 5 is a flowchart of a method of ordering a set of search results in accordance with a user profile.

FIG. 5 is a flowchart of a method that may be implemented using one or more computer programs executed by the server 210 of FIG. 2. The method orders a set of candidate documents based on their personalized anchor text scores in accordance with the present invention. At step 510, the computer program identifies a list of documents that satisfy a set of query terms. Such identification process can be solely dependent upon the textual content of each document as well as the relevance between the textual content and the query terms. Once the list of documents are available, the computer program performs the steps 410-460 described above for each document in the list of documents. If a document has no qualifying source documents (step 420), the personalized AT score for the document is assigned a default value (e.g., zero). In the end (steps 580, 590), the documents in the list are ordered based on their respective personalized rankings that are both user-dependent and query-dependent.

Referring to FIG. 6, an embodiment of a search engine 600 that implements the methods described above includes one or more processing units (CPU's) 602, one or more network or other communications interfaces 610, memory 612, and one or more communication buses 614 for interconnecting these components. The personalized search engine 600 may optionally include a user interface 604 comprising a display device 606 and a keyboard 608. Memory 612 may include high speed random access memory and may also include non-volatile memory, such as one or more magnetic disk storage devices. Memory 612 may include mass storage that is remotely located from the CPU's 602. The memory 612 preferably stores:

- an operating system 616 that includes procedures for handling various basic system services and for performing hardware dependent tasks;
- a network communication module (or instructions) 618 that is used for connecting the search engine 600 to other computers via the one or more communication network interfaces 610 (wired or wireless), such as the Internet, other wide area networks, local area networks, metropolitan area networks, and so on;
- a system initialization module (or instructions) 620 that initializes other modules and data structures stored in memory 612 required for the appropriate operation of the search engine 600;
- a query processor 205 for receiving and processing search queries submitted from various client computers, and then organizing and transmitting search results back to the corresponding client computers;
- a user information database 206 for storing user-specific information of a plurality of users, the database includes a respective user profile 306 for each of a plurality of users;
- a set of databases for use by the query processor 205, including an inverted content index 208, a page importance scores database 209, and an inverted anchor text index 211; and
- search results data structures 302, 330; these data structures include records 640 that store information concerning the documents in the search results for a search query, including an information retrieval score 642, a page importance score 644, a personalized anchor text score 646, and any other values required by the query processor 205 to produce search results listing documents in a personalized order in accordance with the requester's user profile.

The query processor 205 includes a search result ranking function 324 for ordering the documents in a set of search results, and a personalized score generator 622 for generating personalized scores for each document in the search results. The personalized score generator 622 includes a personalized anchor text (AT) score generator 310, as discussed above. In some embodiments, the personalized score generator 622 also includes a personalized information retrieval (IR) score generator 622, also discussed above.

The search engine 600 also includes the network crawler 220, content indexer 213, Page Importance Ranker 215 and anchor text indexer 217, all discussed above.

The software modules of the search engine include instructions for performing the steps of the methods described above, for processing search queries and producing search results that are ordered in accordance with user-specific parameters.

FIG. 6 depicts the internal structure of a search engine 600 in one embodiment. It should be understood that in some other embodiments the personalized search engine 600 may be implemented using multiple servers so as to improve its throughput and reliability. For instance, the network crawler 220, the indexers 213, 217, the Page Importance Ranker 215 and the resulting databases 208, 209, 211 may be implemented on distinct servers that communicate with and work in conjunction with other ones of the servers in the search engine 600.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of determining a personalized ranking of a document that satisfies a set of query terms, comprising:
   determining an information retrieval score for the document based on its content and the set of query terms;
   identifying a set of source documents that have links to the document and that have anchor text satisfying a predefined requirement with respect to the set of query terms;
   calculating personalized page importance scores of the identified source documents according to a set of user-specific parameters;
   accumulating a personalized anchor text score for the document as a function of the personalized page importance scores of the identified source documents; and
   generating a personalized ranking for the document based on its information retrieval score and personalized anchor text score.

2. The method of claim 1, wherein the personalized page importance scores are personalized link analysis scores.

3. The method of claim 1, wherein the predefined requirement comprises a requirement that each of the identified source documents have anchor text that satisfies a search query corresponding to the set of query terms.

4. The method of claim 1, wherein the predefined requirement comprises a requirement that each of the identified source documents have anchor text that contains at least one of the query terms in the set of query terms.

5. The method of claim 1, wherein the personalized page importance score of an identified source document is a function of personalized page importance scores of another set of documents having links to the identified document.

6. The method of claim 1, wherein the personalized page importance score of the identified source document is independent from the set of query terms.

7. The method of claim 1, wherein the set of user-specific parameters include a set of URL keywords, and wherein calculating the personalized page importance score of an identified source document includes determining if a URL of the identified source document matches a URL keyword in the set of URL keywords, and assigning a personalized page importance score to the identified source document in accordance with that determination.

8. The method of claim 1, wherein the set of user-specific parameters include a set of URL keywords and includes a numeric value associated with each URL keyword in the set, and wherein calculating the personalized page importance score of an identified source document includes determining which URL keywords, if any, in the set of URL keywords match a URL of the identified source document, and when at least on the URL keywords is determined to match the URL of the identified source document, assigning a personalized page importance score to the identified source document in accordance with the numeric value associated with at least one of the matching URL keywords.

9. The method of claim 1, including calculating a personalized page importance score for the document, and generating the personalized ranking for the document based on its information retrieval score, its personalized anchor text score, and its personalized page importance score.

10. The method of claim 1, wherein the set of user-specific parameters include information concerning websites favored by a user.

11. The method of claim 1, wherein the set of user-specific parameters include information suitable for identifying websites likely to be favored by a user.

12. The method of claim 1, wherein accumulating a personalized anchor text score for the document includes summing the product of an anchor text-based weight of each of the identified source documents multiplied by its respective personalized page importance score.

13. The method of claim 12, wherein the anchor text-based weight of an identified source document is equal to a first value when its anchor text satisfies a predefined requirement with respect to the set of query terms, and is equal to a second value when the anchor text does not satisfy the predefined requirement with respect to the set of query terms.

14. The method of claim 12, wherein the anchor text-based weight of an identified source document is equal to a first value when its anchor text contains at least one of the set of query terms, and is equal to a second value when the anchor text contains none of the query terms.

15. The method of claim 1, wherein determining an information retrieval score for the document includes calculating a personalized information retrieval score for the document according to the set of user-specific parameters.

16. A method for generating, in response to a set of query terms and a set of user-specific parameters, a list of documents that satisfy the set of query terms, comprising:
- identifying a list of documents from a set of documents in a database, each document satisfying the set of query terms;
- for each document in the list,
  - determining an information retrieval score for the document based on its content;
  - identifying source documents that have links to the document and that have anchor text satisfying a predefined requirement with respect to the set of query terms;
  - calculating personalized page importance scores of the identified source documents according to a set of user-specific parameters;
  - accumulating a personalized anchor text score for the document as a function of the personalized page importance scores of the identified source documents; and
  - generating a personalized ranking for the document based on its information retrieval score and personalized anchor text score; and
- ordering the list of documents according to their respective personalized rankings.

17. The method of claim 16, wherein the personalized page importance scores are personalized link analysis scores.

18. The method of claim 16, the predefined requirement comprises a requirement that each of the identified source documents have anchor text that satisfies a search query corresponding to the set of query terms.

19. The method of claim 16, wherein the predefined requirement comprises a requirement that each of the identified source documents have anchor text that contains at least one of the query terms in the set of query terms.

20. The method of claim 16, wherein the personalized page importance score of an identified source document is a function of personalized page importance scores of another set of documents having links to the identified document.

21. The method of claim 16, wherein the personalized page importance score of the identified source document is independent from the set of query terms.

22. The method of claim 16, wherein the set of user-specific parameters include a set of URL keywords, and wherein calculating the personalized page importance score of an identified source document includes determining if a URL of the identified source document matches a URL keyword in the set of URL keywords, and assigning a personalized page importance score to the identified source document in accordance with that determination.

23. The method of claim 16, wherein the set of user-specific parameters include a set of URL keywords and includes a numeric value associated with each URL keyword in the set, and wherein calculating the personalized page importance score of an identified source document includes determining which URL keywords, if any, in the set of URL keywords match a URL of the identified source document, and when at least on the URL keywords is determined to match the URL of the identified source document, assigning a personalized page importance score to the identified source document in accordance with the numeric value associated with at least one of the matching URL keywords.

24. The method of claim 16, including calculating a personalized page importance score for each document in the list, and generating the personalized ranking for the document based on its information retrieval score, its personalized anchor text score, and its personalized page importance score.

25. The method of claim 16, wherein the set of user-specific parameters include information concerning websites favored by a user.

26. The method of claim 16, wherein the set of user-specific parameters include information suitable for identifying websites likely to be favored by a user.

27. The method of claim 16, wherein accumulating a personalized anchor text score for the document includes summing the product of an anchor text-based weight of each of the identified source documents multiplied by its respective personalized page importance score.

28. The method of claim 27, wherein the anchor text-based weight of an identified source document is equal to a first value when its anchor text satisfies a predefined requirement with respect to the set of query terms, and is equal to a second value when the anchor text does not satisfy the predefined requirement with respect to the set of query terms.

29. The method of claim 27, wherein the anchor text-based weight of an identified source document is equal to a first value when its anchor text contains at least one of the set of query terms, and is equal to a second value when the anchor text contains none of the query terms.

30. The method of claim 16, wherein determining an information retrieval score for the document includes calculating a personalized information retrieval score for the document according to the set of user-specific parameters.

31. A search engine system, comprising:
- one or more central processing units for executing programs; and
- a server executable by the one or more central processing units, the server comprising:
  - instructions for identifying a list of documents from a set of documents in a database, each document satisfying the set of query terms;
  - for each document in the list,
    - instructions for ranking each document in the list of documents, including:
      - instructions for determining an information retrieval score for the document based on its content and the set of query terms;
      - instructions for identifying a set of source documents that have links to the document and that have anchor text satisfying a predefined requirement with respect to the set of query terms;
      - instructions for calculating personalized page importance scores of the identified source documents according to a set of user-specific parameters;
      - instructions for accumulating a personalized anchor text score for the document as a function of the personalized page importance scores of the identified source documents; and
      - instructions for generating a personalized ranking for the document based on its information retrieval score and personalized anchor text score; and
    - instructions for ordering the list of documents according to their respective personalized rankings.

32. The system of claim 31, wherein the personalized page importance scores are personalized link analysis scores.

33. The system of claim 31, wherein the set of user-specific parameters include a set of URL keywords, and wherein the instructions for calculating the personalized page importance score of an identified source document include instructions for determining if a URL of the identified source document matches a URL keyword in the set of URL keywords, and assigning a personalized page importance score to the identified source document in accordance with that determination.

34. The system of claim 31, wherein the set of user-specific parameters include a set of URL keywords and includes a numeric value associated with each URL keyword in the set, and wherein the instructions for calculating the personalized page importance score of an identified source document include instructions for determining which URL keywords, if any, in the set of URL keywords match a URL of the identified source document, and when at least on the URL keywords is determined to match the URL of the identified source document, assigning a personalized page importance score to the identified source document in accordance with the numeric value associated with at least one of the matching URL keywords.

35. The system of claim 31, including instructions for calculating a personalized page importance score for each document in the list, and instructions for generating the personalized ranking for the document based on its information retrieval score, its personalized anchor text score, and its personalized page importance score.

36. The system of claim 31, wherein the instructions for accumulating a personalized anchor text score for the document include instructions for summing the product of an anchor text-based weight of each of the identified source documents multiplied by its respective personalized page importance score.

37. The system of claim 31, wherein the anchor text-based weight of an identified source document is equal to a first value when its anchor text satisfies a predefined requirement with respect to the set of query terms, and is equal to a second value when the anchor text does not satisfy the predefined requirement with respect to the set of query terms.

38. The system of claim 31, wherein the instructions for determining an information retrieval score for the document include instructions for calculating a personalized information retrieval score for the document according to the set of user-specific parameters.

39. A computer readable storage medium storing computer-executable instructions for use in conjunction with a computer system, for determining a personalized ranking of a document that satisfies a set of query terms, comprising:
   instructions for determining an information retrieval score for the document based on its content and the set of query terms;
   instructions for identifying a set of source documents that have links to the document and that have anchor text satisfying a predefined requirement with respect to the set of query terms;
   instructions for calculating personalized page importance scores of the identified source documents according to a set of user-specific parameters;
   instructions for accumulating a personalized anchor text score for the document as a function of the personalized page importance scores of the identified source documents; and
   instructions for generating a personalized ranking for the document based on its information retrieval score and personalized anchor text score.

40. The computer readable storage medium of claim 39, wherein the personalized page importance scores are personalized link analysis scores.

41. The computer readable storage medium of claim 39, wherein the predefined requirement comprises a requirement that each of the identified source documents have anchor text that satisfies a search query corresponding to the set of query terms.

42. The computer readable storage medium of claim 39, wherein the predefined requirement comprises a requirement that each of the identified source documents have anchor text that contains at least one of the query terms in the set of query terms.

43. The computer readable storage medium of claim 39, wherein the personalized page importance score of an identified source document is a function of personalized page importance scores of another set of documents having links to the identified document.

44. The computer readable storage medium of claim 39, wherein the personalized page importance score of an identified source document is independent from the set of query terms.

45. The computer readable storage medium of claim 39, wherein the set of user-specific parameters include a set of URL keywords, and wherein the instructions for calculating the personalized page importance score of an identified source document includes instructions for determining if a URL of the identified source document matches a URL keyword in the set of URL keywords, and instructions for assigning a personalized page importance score to the identified source document in accordance with that determination.

46. The computer readable storage medium of claim 39, wherein the set of user-specific parameters include a set of URL keywords and includes a numeric value associated with each URL keyword in the set, and wherein the instructions for calculating the personalized page importance score of an identified source document include instructions for determining which URL keywords, if any, in the set of URL keywords match a URL of the identified source document, and when at least on the URL keywords is determined to match the URL of the identified source document, assigning a personalized page importance score to the identified source document in accordance with the numeric value associated with at least one of the matching URL keywords.

47. The computer readable storage medium of claim 39, including instructions for calculating a personalized page importance score for each document in the list, and instructions for generating the personalized ranking for the document based on its information retrieval score, its personalized anchor text score, and its personalized page importance score.

48. The computer readable storage medium of claim 39, wherein the instructions for accumulating a personalized anchor text score for the document include instructions for summing the product of an anchor text-based weight of each of the identified source documents multiplied by its respective personalized page importance score.

49. The computer readable storage medium of claim 39, wherein the anchor text-based weight of an identified source document is equal to a first value when its anchor text satisfies a predefined requirement with respect to the set of query terms, and is equal to a second value when the anchor text does not satisfy the predefined requirement with respect to the set of query terms.

50. The computer readable storage medium of claim 39, wherein the instructions for determining an information retrieval score for the document include instructions for calculating a personalized information retrieval score for the document according to the set of user-specific parameters.

51. A computer readable storage medium, for use in conjunction with a computer system, for generating a list of documents that satisfy the set of query terms, comprising:
- instructions for identifying a list of documents from a set of documents in a database, each document satisfying the set of query terms;
- for each document in the list,
  - instructions for ranking each document in the list of documents, including:
    - instructions for determining an information retrieval score for the document based on its content and the set of query terms;
    - instructions for identifying a set of source documents that have links to the document and that have anchor text satisfying a predefined requirement with respect to the set of query terms;
    - instructions for calculating personalized page importance scores of the identified source documents according to a set of user-specific parameters;
    - instructions for accumulating a personalized anchor text score for the document as a function of the personalized page importance scores of the identified source documents; and
    - instructions for generating a personalized ranking for the document based on its information retrieval score and personalized anchor text score; and
- instructions for ordering the list of documents according to their respective personalized rankings.

* * * * *

UNITED STATES PATENT AND TRADEMARK OFFICE
CERTIFICATE OF CORRECTION

| | | |
|---|---|---|
| PATENT NO. | : 7,260,573 B1 | Page 1 of 1 |
| APPLICATION NO. | : 10/848599 | |
| DATED | : August 21, 2007 | |
| INVENTOR(S) | : Jeh et al. | |

It is certified that error appears in the above-identified patent and that said Letters Patent is hereby corrected as shown below:

<u>In the Claims</u>:

Column 17, line 1, after the word "medium" please delete the "," and insert --storing computer-executable instructions--.

Signed and Sealed this

Thirteenth Day of November, 2007

JON W. DUDAS
*Director of the United States Patent and Trademark Office*